F. E. MENDENHALL.
POTATO PLANTER.
APPLICATION FILED JAN. 23, 1917.
1,298,756.
Patented Apr. 1, 1919.
3 SHEETS—SHEET 1.
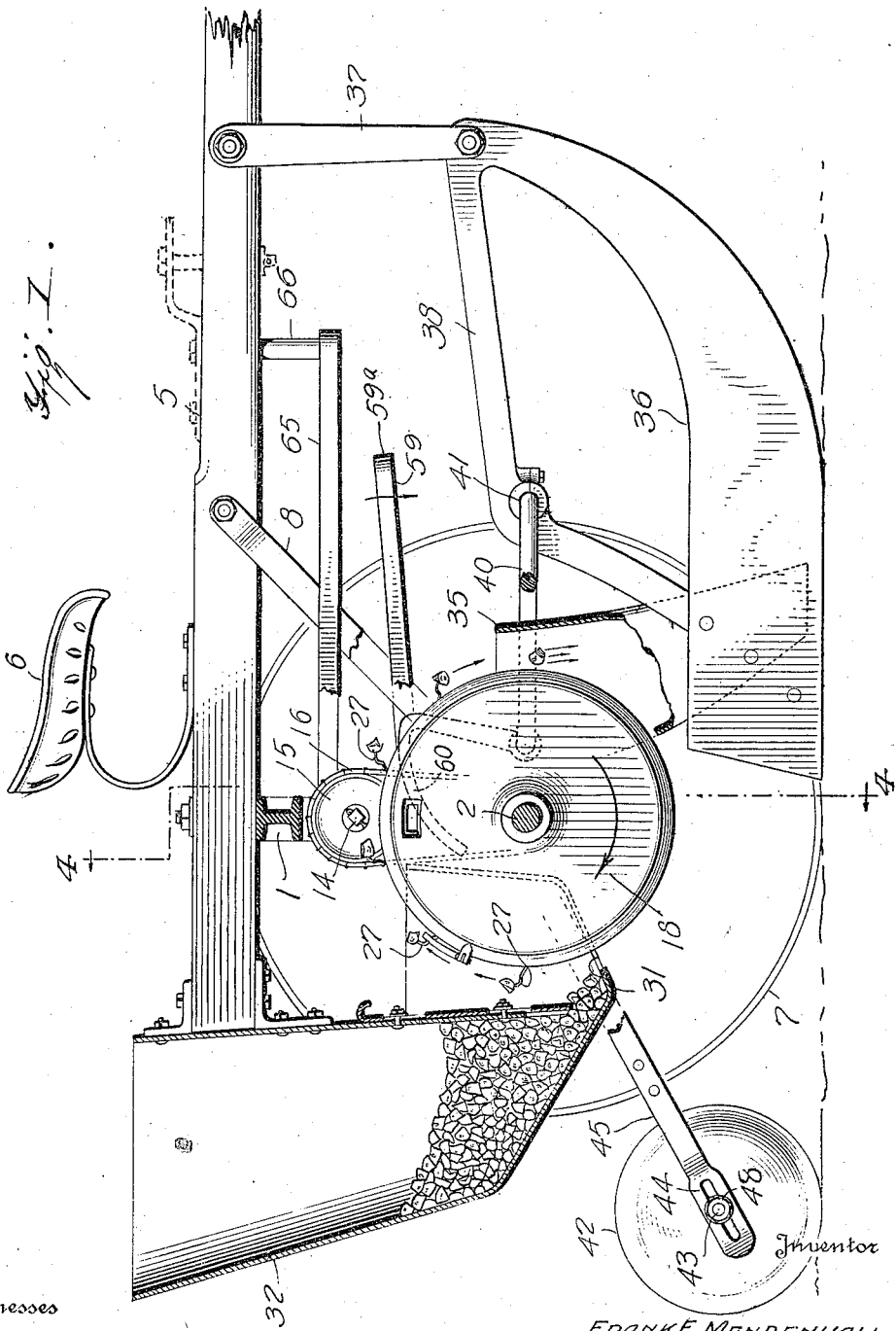

F. E. MENDENHALL.
POTATO PLANTER.
APPLICATION FILED JAN. 23, 1917.
1,298,756.
Patented Apr. 1, 1919.
3 SHEETS—SHEET 2.
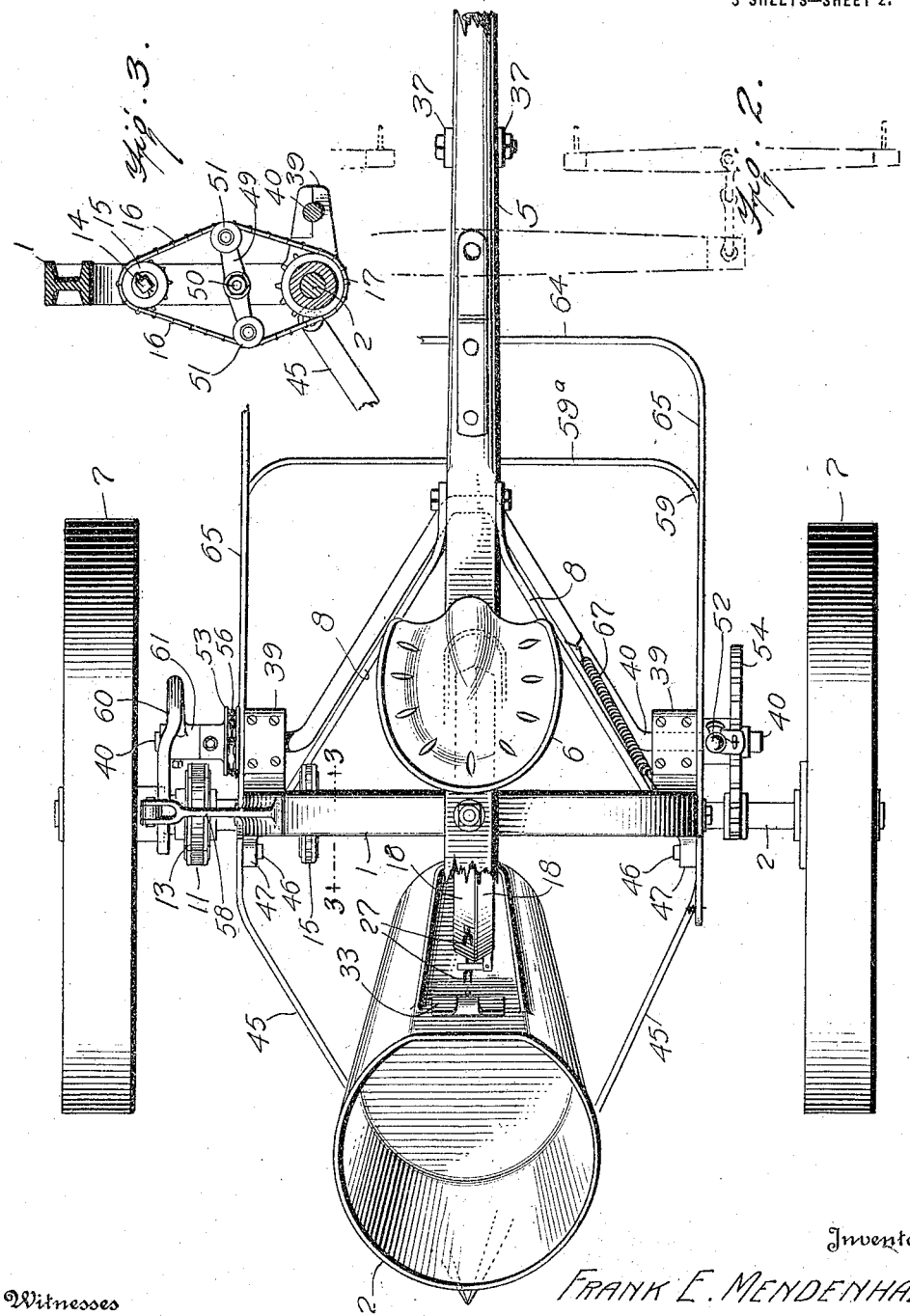
Witnesses
Inventor
FRANK E. MENDENHALL,
By
Attorneys

F. E. MENDENHALL.
POTATO PLANTER.
APPLICATION FILED JAN. 23, 1917.

1,298,756.

Patented Apr. 1, 1919.
3 SHEETS—SHEET 3.

Witnesses

Inventor
FRANK E. MENDENHALL,
By Munn & Co.
Attorneys

UNITED STATES PATENT OFFICE.

FRANK E. MENDENHALL, OF KILGORE, NEBRASKA.

POTATO-PLANTER.

1,298,756.

Specification of Letters Patent.  Patented Apr. 1, 1919.

Application filed January 23, 1917. Serial No. 143,927.

*To all whom it may concern:*

Be it known that I, FRANK E. MENDENHALL, a citizen of the United States, and a resident of Kilgore, in the county of Cherry and State of Nebraska, have invented certain new and useful Improvements in Potato-Planters, of which the following is a specification.

My invention is an improvement in potato planters, and has for its object to provide a planter of the character specified wherein the cuts are taken from a hopper in succession and are delivered one by one into a leg or dropper chute, and wherein a furrow opener is provided in connection with the dropper chute for opening a furrow to receive the cuts, and wherein covering mechanism is provided for covering the cuts after they have been dropped into the furrow and other mechanism for simultaneously lifting the furrow opener, the covering mechanism, and for disconnecting the dropping device from its operating mechanism.

In the drawings:

Figure 1 is a longitudinal section through the improved planter,

Fig. 2 is a top plan view,

Fig. 3 is a section on the line 3—3 of Fig. 2, looking in the direction of the arrows adjacent to the line.

Figure 4:
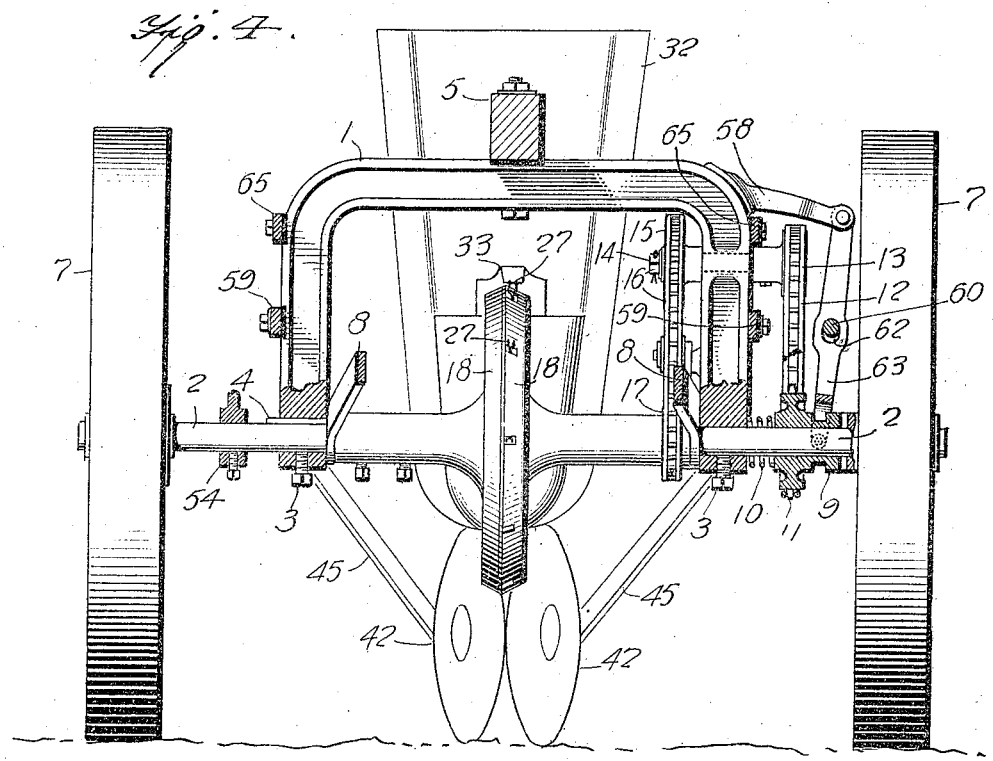
Fig. 4 is a section on the line 4—4 of Fig. 1, looking in the direction of the arrows adjacent to the line.

In the present embodiment of the invention, a frame is provided, consisting of an arch bar 1 having openings in its arms through which pass the axle 2, and set screws 3 are threaded through the arms into engagement with the axle, and the axle is also keyed in one of the openings as indicated at 4. A tongue 5 is connected with the arch bar and the tongue supports a seat 6. Wheels 7 are journaled on the ends of the axle and the tongue is braced against the axle by inclined braces 8.

One of the wheels 7 is provided with one of the parts of a clutch, the other part being on a sleeve 9 which is normally pressed into engagement with the wheel by means of a coil spring 10 encircling the axle between the arch bar and the sleeve. Mechanism to be later described is provided for operating the clutch, and the sleeve carries a sprocket wheel 11, which is connected by a chain 12 with a sprocket wheel 13 on a countershaft 14 journaled in the adjacent arm of the arch bar. This counter-shaft carries a sprocket wheel 15 which is connected by a chain 16 with a wheel 17 on the hub of the dropping wheel, to be later described. Thus when the clutch sections are in engagement with each other, it will be obvious that the dropping wheel will be driven.

The dropping wheel 18, as shown, is provided with impaling forks 27 which are projected and withdrawn from the wheel to pick up and discharge the potato cuts, and a hopper 32 is provided for holding the cuts, the impaling forks moving through an extension 31 at the lower end of the hopper to pick up the cuts.

A furrow opener 36 is supported in front of the dropping wheel and the feed chute, said furrow opener being of the usual construction and having its upturned front end connected by a link 37 with the tongue. This furrow opener has a beam 38.

Each of the arms of the arch bar carries at the front thereof a sectional bearing 39 in which is journaled the offset ends 40 of a shaft consisting of the said ends and a body portion 41, which is journaled in the beam. It will be evident that when the shaft 41 is oscillated, the furrow opener will be raised and lowered at its rear end. The dropping chute 35 delivers the cuts into the furrow opener so that they fall directly into the furrow opened by the furrow opener, and they are covered by the covering mechanism shown in Figs. 1, 2 and 4.

The said mechanism comprises a pair of disks 42, which are journaled on stub shafts 43. These stub shafts engage slots 44 in arms 45 which have inwardly extending journal pins 46 received in bearings 47 on the rear of the arms of the arch bar 1. The stub shafts 43 are held in place in the slots by nuts 48, and it will be evident that by loosening the nuts the disks may be adjusted with respect to the arms, and the disks are inclined toward each other in such manner that each will throw the dirt inwardly toward the other disk, and the cuts in the furrow will be covered.

Figure 5:
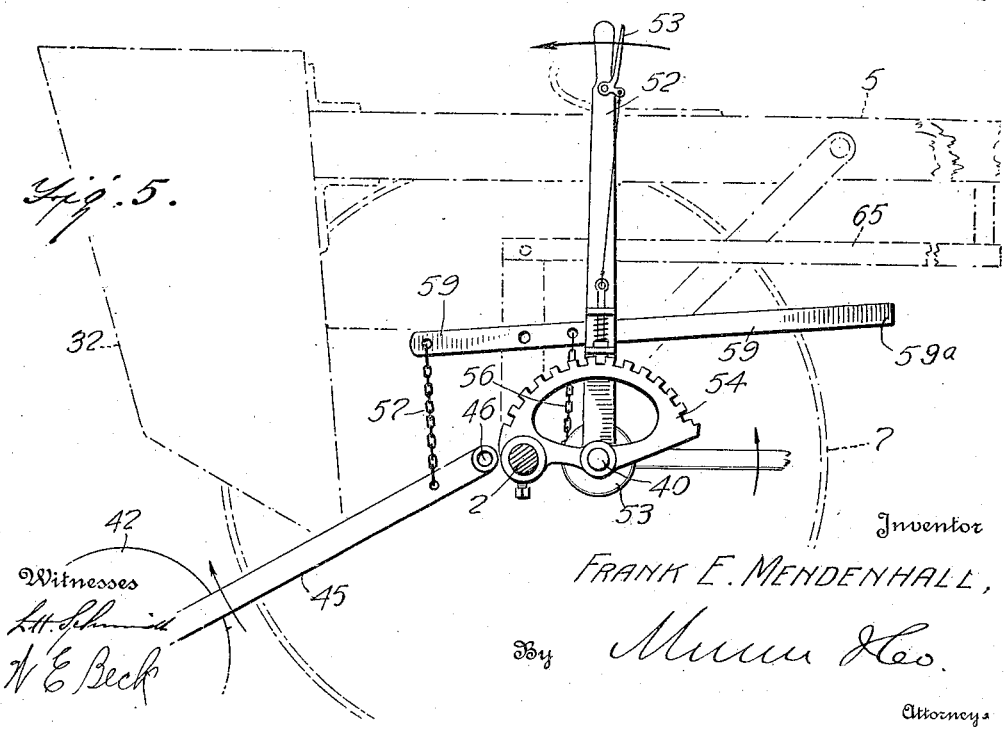
Fig. 5 is a side view of the operating mechanism for the plow, and the covering mechanism.

Means shown in Fig. 3 is provided for tightening the chain 16. The said means comprises a cross arm 49 secured to the adjacent arm of the arch bar 1 by means of a bolt and nut 50, between the axle 2 and the shaft 14. This cross arm has idlers 51 journaled on its ends, and the idlers engage the opposite runs of the chain 16. It will be obvious that by varying the angle of the cross arm with respect to the line connecting the shafts 2 and 14, the chain may be tensioned. The rear end of the furrow opener and the disks 42 are lifted and the dropping wheel is simultaneously thrown out of gear by the lever 52, shown in Figs. 2 and 5. This lever is rigid with one of the ends 40 of the shaft 40—41, and the said lever is provided with latch mechanism 53 which coöperates with a quadrant 54 supported by the axle 2 and the shaft 40—41.

A reel or pulley 55 is secured to the portion 40 of the shaft adjacent to the lever, and upon this reel or pulley winds one end of a chain 56. The other end of the chain is connected to one of the arms 59 of a U-shaped bar consisting of the said arms and a body 59ª extending transversely of the tongue beneath the same, the arms extending rearwardly from the body. Each arm is pivoted to the arch bar as shown, near the rear end of the arm, and a second chain 57 connects the rear end of each arm with the adjacent arm 45.

It will be evident that when the lever 52 is moved in the direction to wind up the chain, that is in the direction of the arrow, the body 41 of the shaft 40—41 will be lifted. The bar 59—59ª will be swung downward at its forward end, and through the chain 57 the covering mechanism will also be lifted. By moving downward the body of the bar 59—59ª, the covering mechanism may be lifted independently of the shaft 40—41.

A cam arm 60 is connected with the other portion 40 of the shaft 40—41, the said arm having a hub 61 held in place on the said portion 40 of the shaft by a set screw, as shown, and this arm passes through a slot 62 in a lever 63 which is pivoted at its upper end to the bracket 58 and engages at its lower end the sleeve 9. This cam arm is so shaped that when the body 41 of the shaft 40—41 is lifted, the lever 63 will be moved in a direction to release the sleeve 9 from the adjacent wheel.

It will be noticed from an inspection of Fig. 2 that the rear end of the arm 60 is offset outwardly. The arms 59 of a bar 59—59ª are pivoted to the arch bar 1, and a U-shaped brace bar consisting of a body 64 and arms 65, is arranged between the arch bar 1 and the tongue, the arms being bolted rigidly to the arch bar while the body is connected to the tongue by a hanger 66. A spring 67 is arranged between the rear end of the furrow opener and the frame or arch bar for counter-balancing the said rear end.

In operation, the potato cuts are placed in the feed hopper, as shown, and the feed opening of the hopper is regulated by means of the door 33 so that a number of cuts will lie upon the extension 31 without falling off. When the machine is ready for operation, the furrow opener is lowered to the ground, as are also the disks, and the same lever which performs these operations throws the dropping mechanism into gear. As the machine moves forwardly the dropping wheel will be rotated and the impaling forks 27 will pass in succession through the extension of the hopper, and each fork will pick up a single cut. As the forks pass over to the front of the wheel and down the same, the cuts will be dislodged as the forks withdraw and will fall into the chute which will deliver them through the furrow opener into the furrow, which has been opened by the said opener. As the disks roll along, they will turn the dirt into the furrow, covering lightly the just deposited cuts.

I claim:

1. In a potato planter, an axle, wheels on the ends of the axle, an arch bar having bearings in its arms, an axle journaled in the bearings, a tongue secured to the body of the arch bar and extending beyond the arch bar at its rear end, a hopper for holding potato cuts secured to the said rear end of the tongue, a dropping wheel on the axle between the arms of the arch bar, said hopper being at the rear of the dropping wheel and having an extension provided with a slot in its bottom, the dropping wheel having forks passing through the slot, said extension being adapted to hold cuts for engagement by the forks, a furrow opener and a shoe delivering to the opener and in front of the wheel.

2. In a potato planter, an axle, wheels on the ends of the axle, an arch bar having bearings in its arms, an axle journaled in the bearings, a tongue secured to the body of the arch bar and extending beyond the arch bar at its rear end, a hopper for holding potato cuts secured to the said rear end of the tongue; a dropping wheel on the axle between the arms of the arch bar, the dropping wheel having means for engaging the potato cuts in the hopper.

FRANK E. MENDENHALL.

Witnesses:
LEWIS GOODRICH,
J. C. SNYDER.